(12) United States Patent
Festag et al.

(10) Patent No.: US 11,691,552 B2
(45) Date of Patent: Jul. 4, 2023

(54) VEHICLE SEATS THAT INCLUDE SOUND CANCELATION SYSTEMS

(71) Applicant: Lear Corporation, Southfield, MI (US)

(72) Inventors: Peter Festag, Erding (DE); Jochen Kohlhofer, Kumhausen (DE); Stefan Willems, Leuven (BE)

(73) Assignee: Lear Corporation, Southfield, MI (US)

( * ) Notice: Subject to any disclaimer, the term of this patent is extended or adjusted under 35 U.S.C. 154(b) by 355 days.

(21) Appl. No.: 17/063,175

(22) Filed: Oct. 5, 2020

(65) Prior Publication Data
US 2022/0108678 A1    Apr. 7, 2022

(51) Int. Cl.
*B60N 2/879* (2018.01)
*B60N 2/64* (2006.01)
*B60N 2/885* (2018.01)
*G10K 11/175* (2006.01)
*B60N 2/75* (2018.01)

(52) U.S. Cl.
CPC ............... *B60N 2/879* (2018.02); *B60N 2/64* (2013.01); *B60N 2/885* (2018.02); *G10K 11/175* (2013.01); *B60N 2/757* (2018.02); *G10K 2210/1282* (2013.01); *G10K 2210/3221* (2013.01)

(58) Field of Classification Search
CPC .......... B60N 2/879; B60N 2/64; B60N 2/757; G10K 2210/1282; G10K 2210/3221; B60R 11/0217; B60R 11/0223
See application file for complete search history.

(56) References Cited

U.S. PATENT DOCUMENTS

| | | | | |
|---|---|---|---|---|
| 3,385,393 A | * | 5/1968 | Gold | H04R 5/023 5/904 |
| 3,512,605 A | * | 5/1970 | Mccorkle | B60N 2/812 381/301 |
| 4,027,112 A | * | 5/1977 | Heppner | H04R 5/023 381/301 |
| 5,287,412 A | * | 2/1994 | Etzel | H04R 1/025 381/86 |
| 5,387,026 A | * | 2/1995 | Matsuhashi | A47C 7/727 297/217.4 |
| 5,687,246 A | * | 11/1997 | Lancon | B60R 11/0217 381/338 |
| 6,681,024 B2 | * | 1/2004 | Klein | H04R 5/02 381/301 |

(Continued)

*Primary Examiner* — David R Dunn
*Assistant Examiner* — Tania Abraham
(74) *Attorney, Agent, or Firm* — MacMillan, Sobanski & Todd, LLC

(57) ABSTRACT

Seats that include sound cancelation systems are described. An example vehicle bench seat has a first backrest, a first speaker, a second backrest, a second speaker, a central portion, and a seat base. The first speaker is disposed within the first backrest and the second speaker is disposed within the second backrest. Each of the first and second speakers emit primary sound waves and secondary sound waves. The secondary sound waves of the first speaker are 180 degrees out of phase with the primary sound waves of the first speaker and the secondary sound waves of the second speaker are 180 degrees out of phase with the primary sound waves of the second speaker. The central portion includes channels that direct the secondary sound waves emitted by the first and second speakers into the vehicle cabin to cancel undesired primary sound waves.

20 Claims, 9 Drawing Sheets

(56) References Cited

U.S. PATENT DOCUMENTS

| | | | |
|---|---|---|---|
| 6,975,737 B2* | 12/2005 | Hirao | B60N 2/803 |
| | | | 381/86 |
| 7,159,938 B1* | 1/2007 | Shiraishi | B60R 11/0217 |
| | | | 297/217.4 |
| 8,126,159 B2 | 2/2012 | Goose et al. | |
| 8,565,442 B2 | 10/2013 | Maeda et al. | |
| 9,424,828 B2 | 8/2016 | Warkentin et al. | |
| 9,517,732 B2* | 12/2016 | Silzle | H04R 1/025 |
| 9,773,495 B2 | 9/2017 | MacNeille et al. | |
| 2002/0076059 A1* | 6/2002 | Joynes | G10K 11/1785 |
| | | | 381/71.4 |
| 2009/0295202 A1* | 12/2009 | Takada | H04R 1/028 |
| | | | 297/217.4 |
| 2015/0117668 A1* | 4/2015 | Niss | B60N 2/879 |
| | | | 381/86 |
| 2016/0137106 A1* | 5/2016 | Subat | H04R 1/023 |
| | | | 381/389 |
| 2017/0072869 A1* | 3/2017 | Ito | H04R 5/023 |
| 2019/0039492 A1* | 2/2019 | Von Saint-George | |
| | | | B60N 2/879 |
| 2019/0115006 A1 | 4/2019 | Torres et al. | |

\* cited by examiner

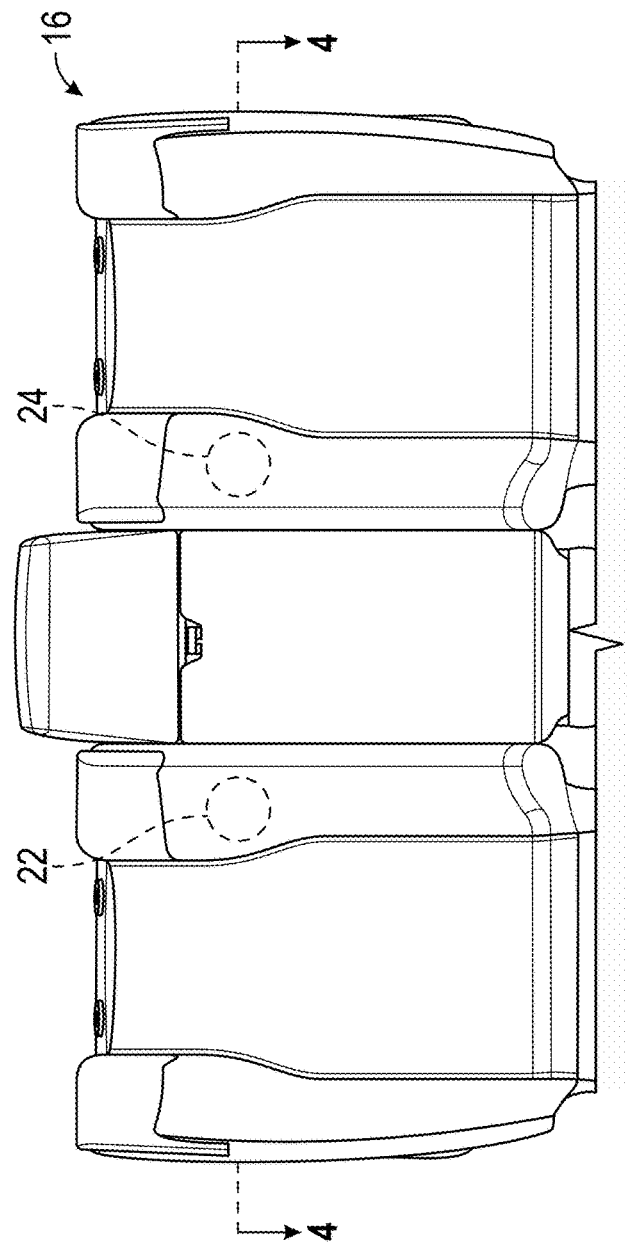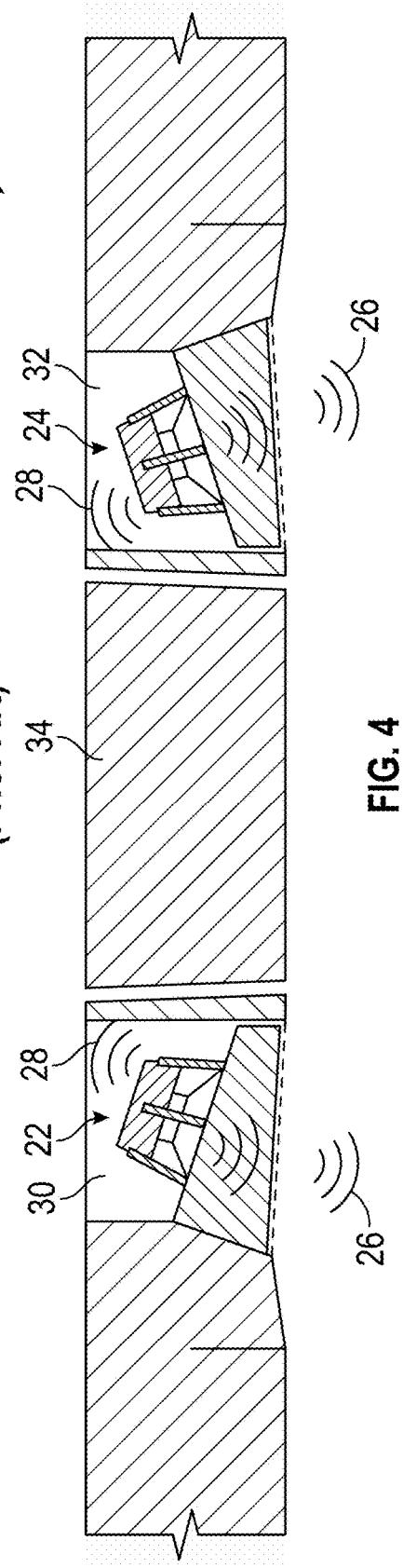

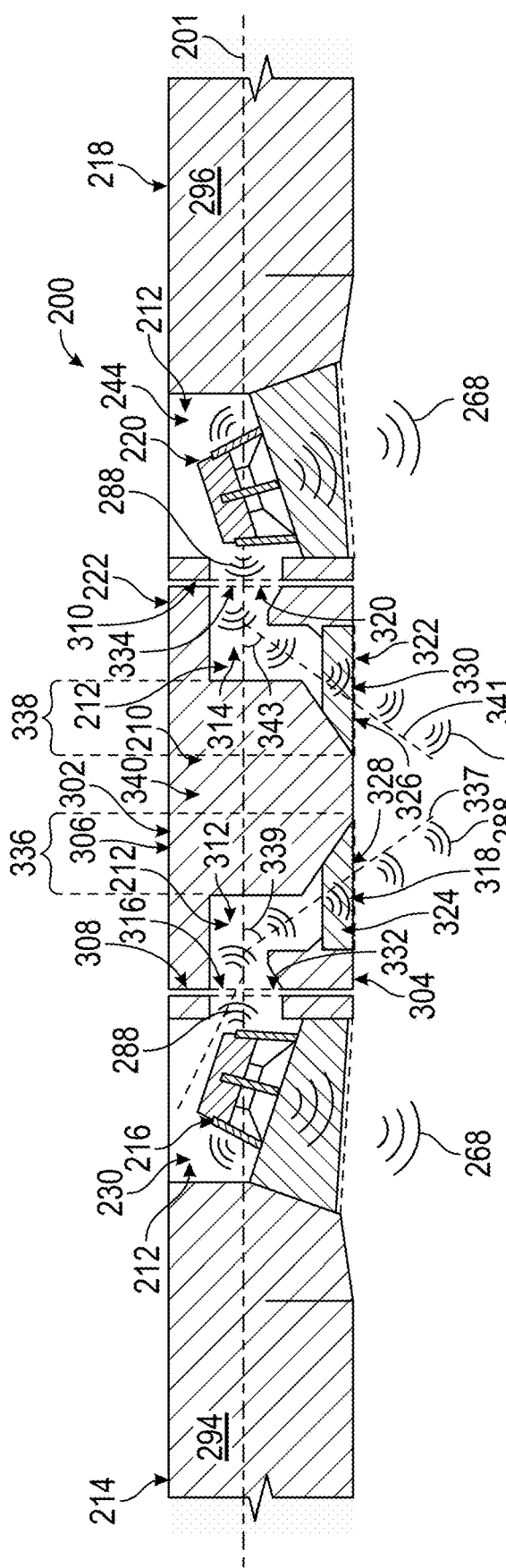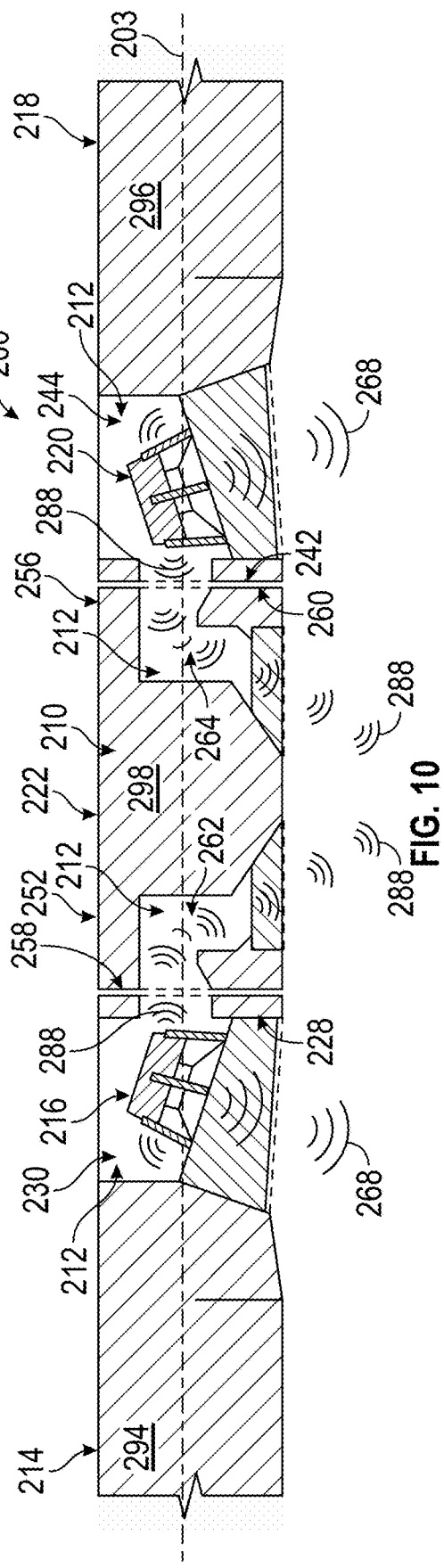

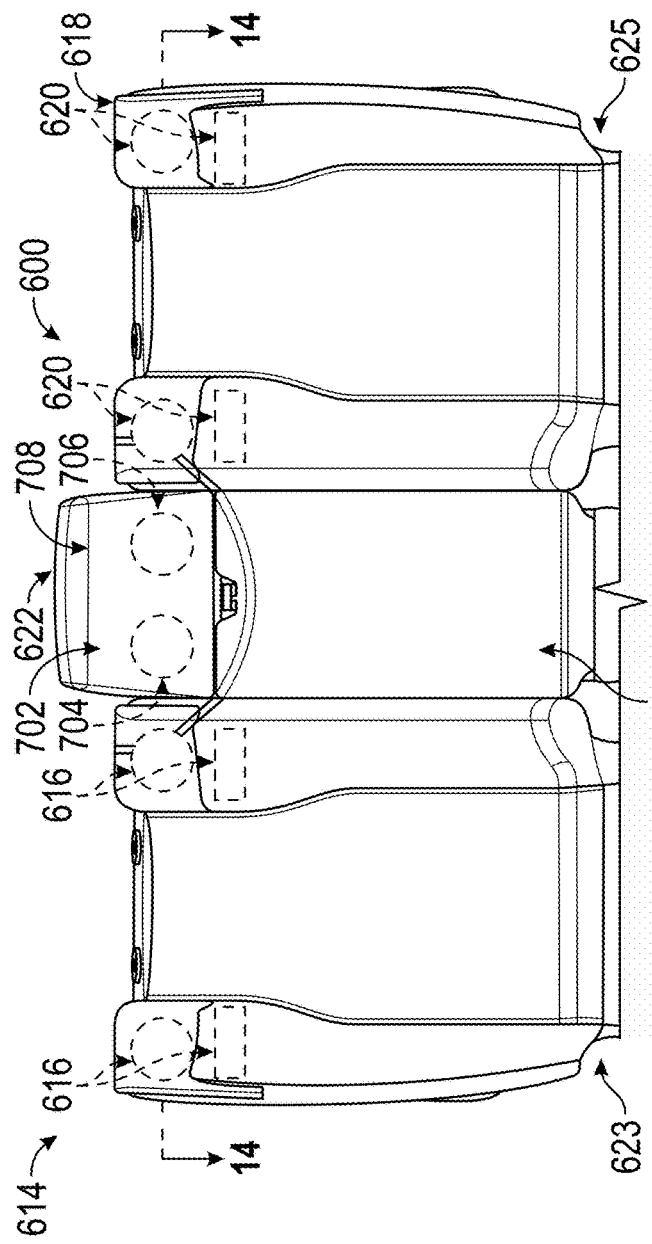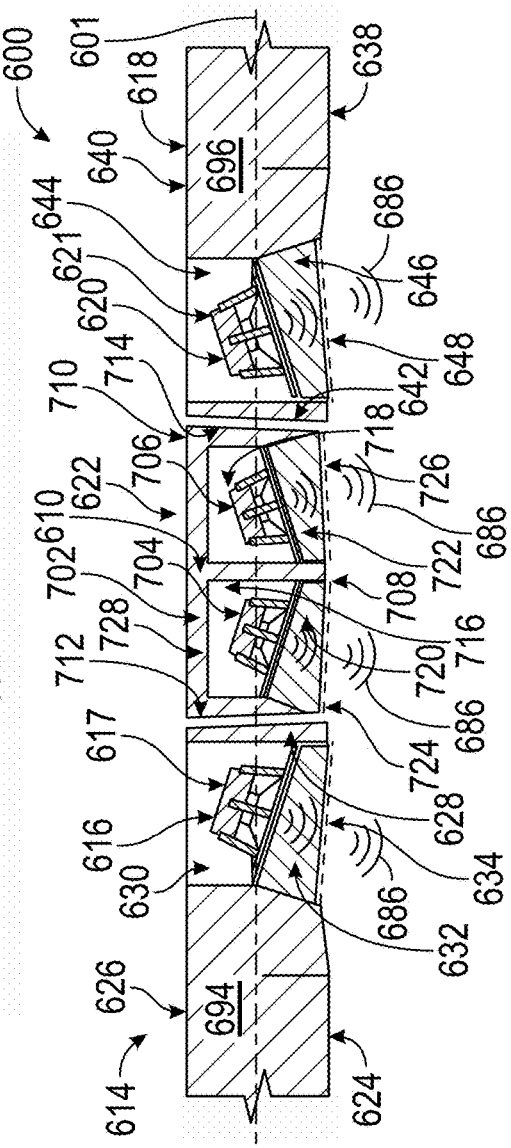

VEHICLE SEATS THAT INCLUDE SOUND CANCELATION SYSTEMS

FIELD

The disclosure relates generally to the field of seats that include acoustic output devices. More particularly, the disclosure relates to vehicle seats that include sound cancelation systems.

BACKGROUND

In some vehicles, speakers are divided into groups that are associated with different zones within a vehicle cabin. When speakers in two or more zones are actively emitting sound waves from different audio sources they create a mix of sounds that can be unpleasant for occupants of the vehicle cabin without adequate sound cancelation being implemented. To be effective, sound canceling waves should be directed toward the occupant desiring to cancel certain sound waves without any acoustic barriers being disposed between the sound canceling waves and the occupant.

For example, as shown in FIGS. 1 through 4, a conventional vehicle cabin includes first and second bucket seats 12, 14 and a rear bench seat 16. The first bucket seat 12 has a first speaker 18, the second bucket seat 14 has a second speaker 20, and the rear bench seat 16 has a third speaker 22 and a fourth speaker 24. Each of the speakers 18, 20, 22, 24 emits primary sound waves 26 and secondary sound waves 28 during use. With respect to the first and second bucket seats 12, 14, the secondary sound waves 28 of the first speaker 18 cancel, or zero out, the primary sounds waves 26 of the first speaker 18 and the secondary sound waves 28 of the second speaker 20 cancel, or zero out, the primary sound waves 26 of the second speaker 20. As shown in FIGS. 1 and 2, the first and second bucket seats 12, 14 include slots 29 through which the secondary sound waves 28 travel such that sound cancelation can be accomplished. In addition, the first and second bucket seats 12, 14 do not have any acoustic barriers between the seats 12, 14 preventing the secondary sound waves 28 from canceling the primary sound waves 26. Therefore, while conventional bucket seats 12, 14 provide a mechanism to cancel sound waves, they fail to provide any directionality to the secondary sound waves 28 reducing the overall impact of sound cancelation to the occupants.

With respect to the rear bench seat 16, the third speaker 22 is disposed within a first chamber 30, the second speaker 24 is disposed within a second chamber 32, and an armrest 34 is disposed between the third and fourth speakers 22, 24. As shown in FIG. 4, the secondary sound waves 28 of the third and fourth speakers 22, 24 are prevented from traveling outside of the respective chambers 30, 32. Furthermore, when the armrest 34 is in the upright, stored position, it presents an acoustic barrier between the third and fourth speakers 22, 24 preventing any secondary sound waves 28 from canceling the primary sound waves 26.

A need exists, therefore, for new and useful vehicle seats that include sound cancelation systems.

SUMMARY OF SELECTED EXAMPLE EMBODIMENTS

Various example seats that include sound cancelation systems are described herein.

An example seat includes a first backrest, a first speaker, a second backrest, a second speaker, and a central portion. The first backrest has a first occupant support portion, a first side, and defines a first channel that extends from the first occupant support portion to the first side. The first speaker is disposed within the first channel. The second backrest has a second occupant support portion, a second side, and defines a second channel that extends from the second occupant support portion to the second side. The second speaker is disposed within the second channel. The central portion is disposed between the first backrest and the second backrest. The central portion has a third occupant support portion, a third side directed toward the first backrest, a fourth side directed toward the second backrest, and defines a third channel that extends from the third side to the third occupant support portion, and a fourth channel that extends from the fourth side to the third occupant support portion.

Another example seat includes a first backrest, a first speaker, a second backrest, a second speaker, and a central portion. The first backrest has a first occupant support portion, a first side, and defines a first channel that extends from the first occupant support portion to the first side. The first speaker is disposed within the first channel and emits primary sound waves and secondary sound waves during use. The second backrest has a second occupant support portion, a second side, and defines a second channel that extends from the second occupant support portion to the second side. The second speaker is disposed within the second channel and emits primary sound waves and secondary sound waves during use. The central portion is disposed between the first backrest and the second backrest. The central portion includes a pivotable armrest that is moveable between an upright position and a lowered position. The pivotable armrest has a third occupant support portion, a third side directed toward the first backrest, a fourth side directed toward the second backrest, and defines a third channel that extends from the third side to the third occupant support portion, and a fourth channel that extends from the fourth side to the third occupant support portion. The third channel has a first end disposed adjacent to the first channel when the pivotable armrest is in the upright position. The fourth channel has a first end disposed adjacent to the second channel when the pivotable armrest is in the upright position. The first speaker is disposed within the first channel such that a portion of the secondary sound waves of the first speaker travel through the first channel and the third channel. The second speaker is disposed within the second channel such that a portion of the secondary sound waves of the second speaker travel through the second channel and the fourth channel.

Another example seat includes a first backrest, a first speaker, a second backrest, a second speaker, and a central portion. The first backrest has a first occupant support portion, a first side, and defines a first channel that extends from the first occupant support portion to the first side. The first speaker is disposed within the first channel and emits primary sound waves and secondary sound waves during use. The secondary sound waves of the first speaker are zeroing waves that are 180 degrees out of phase relative to the primary sound waves of the first speaker. The second backrest has a second occupant support portion, a second side, and defines a second channel that extends from the second occupant support portion to the second side. The second speaker is disposed within the second channel and emits primary sound waves and secondary sound waves during use. The secondary sound waves of the second speaker are zeroing waves that are 180 degrees out of phase relative to the primary sound waves of the second speaker. The central portion is disposed between the first backrest and the second backrest. The central portion includes a pivotable armrest that is moveable between an upright position and a lowered position. The pivotable armrest has a third occupant support portion, a third side directed toward the first backrest, a fourth side directed toward the second backrest, and defines a third channel that extends from the third side to the third occupant support portion, and a fourth channel that extends from the fourth side to the third occupant support portion. The third channel has a first end disposed adjacent to the first channel when the pivotable armrest is in the upright position. The third channel directs the secondary sound waves of the first speaker away from the central portion and the first speaker. The fourth channel has a first end disposed adjacent to the second channel when the pivotable armrest is in the upright position. The fourth channel directs the secondary sound waves of the second speaker away from the central portion and the second speaker. The first speaker is disposed within the first channel such that a portion of the secondary sound waves of the first speaker travel through the first channel and the third channel. The second speaker is disposed within the second channel such that a portion of the secondary sound waves of the second speaker travel through the second channel and the fourth channel.

Additional understanding of these examples can be obtained by review of the detailed description, below, and the appended drawings.

BRIEF DESCRIPTION OF THE DRAWINGS

FIG. 3 is a partial elevation view of a prior art vehicle bench seat. The armrest is illustrated in an upright, or stored, position.

FIG. 4 is a partial cross-sectional view of the vehicle bench seat illustrated in FIG. 3 taken along line 4-4.

FIG. 9 is a partial cross-sectional view of the vehicle bench seat illustrated in FIG. 8 taken along line 9-9.

FIG. 10 is a partial cross-sectional view of the vehicle bench seat illustrated in FIG. 8 taken along line 10-10.

FIG. 13 is a partial elevation view of a fourth embodiment of a vehicle bench seat that includes a sound cancelation system. The armrest and headrest are illustrated in an upright position.

FIG. 14 is a partial cross-sectional view of the vehicle bench seat illustrated in FIG. 13 taken along line 14-14.

DETAILED DESCRIPTION OF SELECTED EXAMPLES

The following detailed description and the appended drawings describe and illustrate various example embodiments of seats that include a sound canceling system. The description and illustration of these examples are provided to enable one skilled in the art to make and use a seat that includes a sound canceling system. They are not intended to limit the scope of the claims in any manner.

Figure 1:
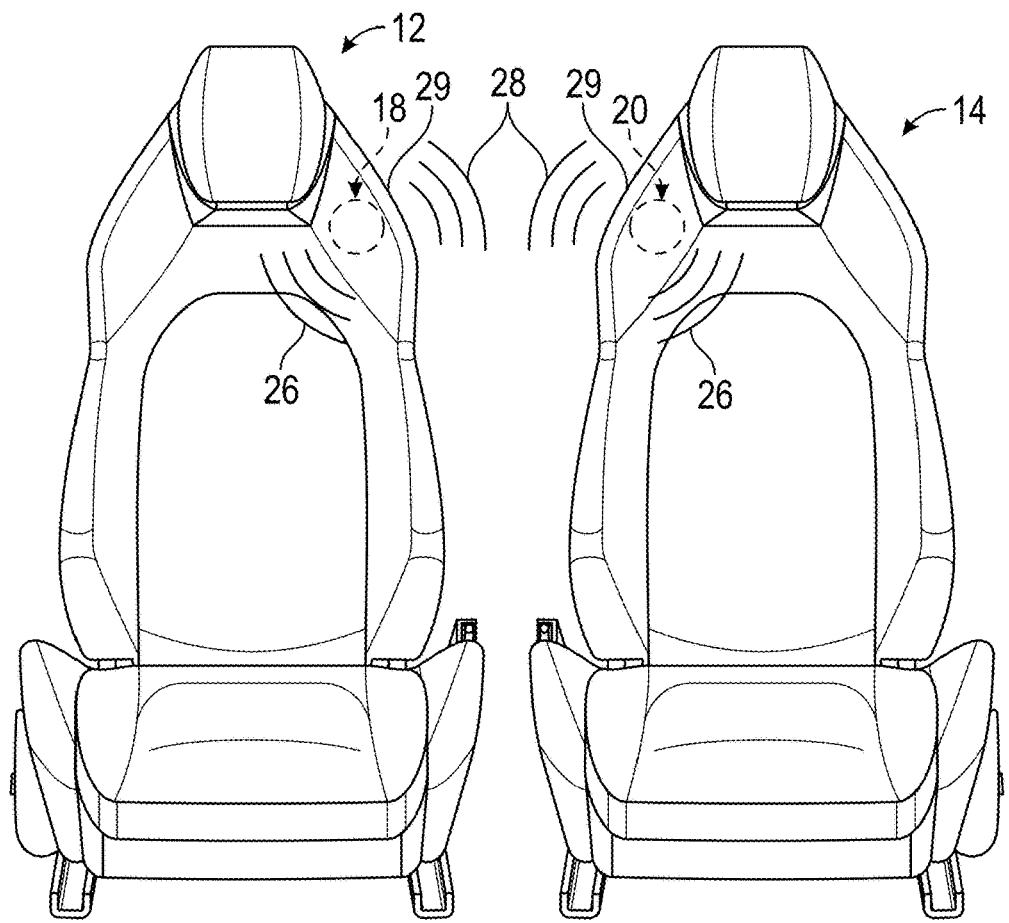
FIG. 1 is an elevation view of prior art vehicle bucket seats.
Figure 2:
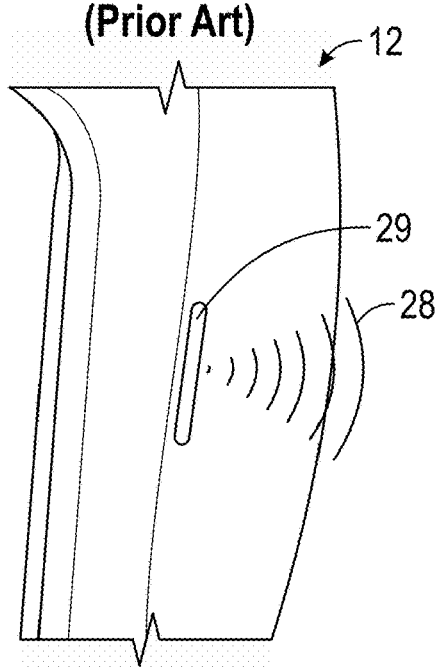
FIG. 2 is a partial perspective side view of the first bucket seat illustrated in FIG. 1.
Figure 6:
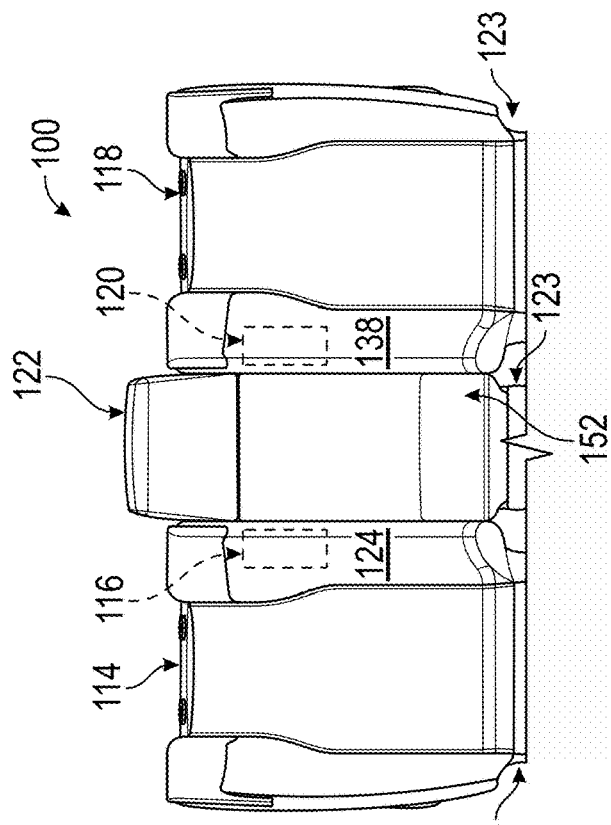
FIG. 6 is another partial elevation view of the vehicle bench seat illustrated in FIG. 5. The armrest is illustrated in a lowered position.
Figure 5:
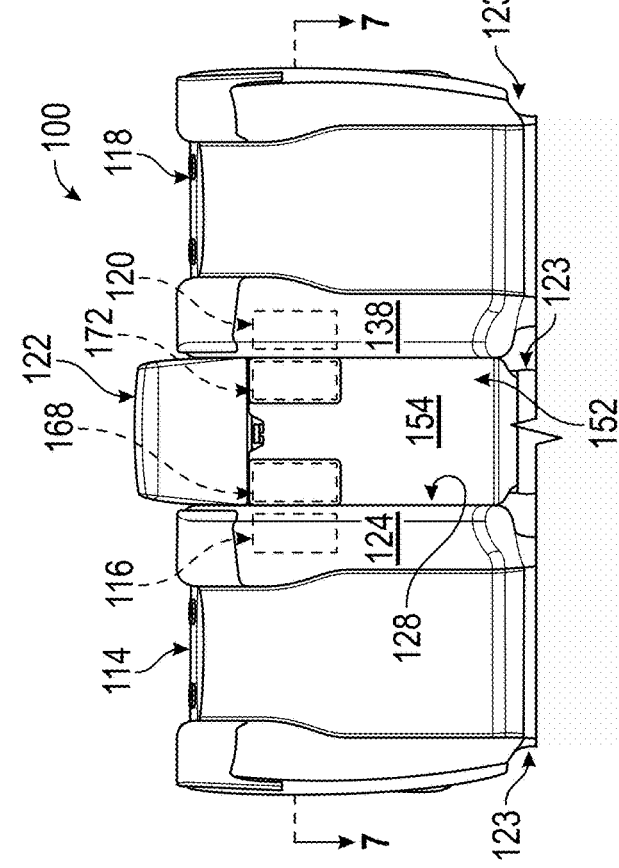
FIG. 5 is a partial elevation view of a first embodiment of a vehicle bench seat that includes a sound cancelation system. The armrest is illustrated in an upright, or stored, position.
Figure 7:
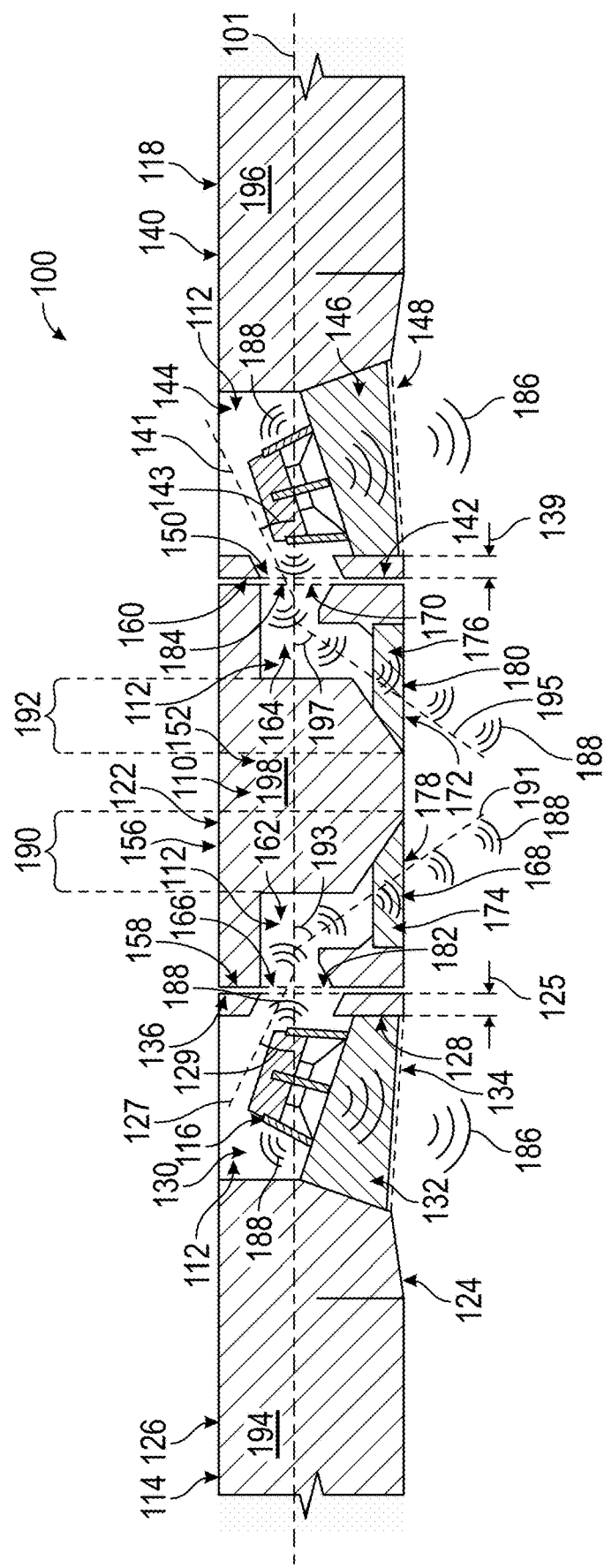
FIG. 7 is a partial cross-sectional view of the vehicle bench seat illustrated in FIG. 5 taken along line 7-7.

FIGS. 5, 6, and 7 illustrate a first embodiment of a vehicle bench seat 100 that includes a sound cancelation system 110. In the illustrated embodiment, the sound cancelation system 110 includes channels 112 disposed within the vehicle bench seat 100. The vehicle bench seat 100 has a lengthwise axis 101, a first backrest 114, a first speaker 116, a second backrest 118, a second speaker 120, a central portion 122, and a seat base 123 disposed adjacent to the first backrest 114, the second backrest 118, and the central portion 122.

The first backrest 114 has a first occupant support portion 124, a first rear portion 126, a first side 128, and defines a first channel 130. The first side 128 extends from the first occupant support portion 124 to the first rear portion 126. The first channel 130 extends from the first occupant support portion 124 to the first side 128. The first speaker 116 is disposed within the first channel 130 defined by the first backrest 114, The first backrest 114 includes a first acoustically transparent material 132 between the first speaker 116 and the first occupant support portion 124, a first perforated trim 134 adjacent to the first acoustically transparent material 132 along the first occupant support portion 124, and a second perforated trim 136 between the first speaker 116 and the central portion 122.

The second backrest 118 has a second occupant support portion 138, a second rear portion 140, a second side 142, and defines a second channel 144. The second side 142 extends from the second occupant support portion 138 to the second rear portion 140. The second channel 144 extends from the second occupant support portion 138 to the second side 142. The second speaker 120 is disposed within the channel 144 defined by the second backrest 118. The second backrest 118 includes a second acoustically transparent material 146 between the second speaker 120 and the second occupant support portion 138, a third perforated trim 148 adjacent to the second acoustically transparent material 146 along the occupant support portion 138, and a fourth perforated trim 150 between the second speaker 120 and the central portion 122.

The central portion 122 is disposed between the first backrest 114 and the second backrest 118. In the illustrated embodiment, the central portion 122 includes a pivotable armrest 152 that is moveable between an upright, or stored, position, as shown in FIGS. 5 and 7, and a lowered position, as shown in FIG. 6. When the pivotable armrest 152 is in the upright position, the central portion 122 has a third occupant support portion 154, a third rear portion 156, a third side 158, a fourth side 160, and defines a third channel 162 and a fourth channel 164. The third side 158 is directed toward, and disposed adjacent to, the first backrest 114 and the fourth side 160 is directed toward, and disposed adjacent to, the second backrest 118. Each of the third side 158 and the fourth side 160 extends from the third occupant support portion 154 to the third rear portion 156. The third channel 162 extends from the third side 158 to the third occupant support portion 154. The fourth channel 164 extends from the fourth side 160 to the third occupant support portion 154. In the illustrated embodiment, each of the third channel 162 and the fourth channel 164 is defined on the pivotable armrest 152.

The third channel 162 defined by the central portion 122 extends from a first end 166 disposed at the third side 158 to a second end 168 disposed at the third occupant support portion 154. When the pivotable armrest 152 is in the upright position, the first end 166 of the third channel 162 is disposed adjacent to the first channel 130 defined by the first backrest 114. The fourth channel 164 defined by the central portion 122 extends from a first end 170 disposed at the second side 142 to a second end 172 disposed at the third occupant support portion 154, When the pivotable armrest 152 is in the upright position, the first end 170 of the fourth channel 164 is disposed adjacent to the second channel 144 defined by the second backrest 118.

In the illustrated embodiment, the central portion 122 includes a third acoustically transparent material 174 at the second end 168 of the third channel 162 adjacent to the third occupant support portion 154 and a fourth acoustically transparent material 176 at the second end 172 of the fourth channel 164 adjacent to the third occupant support portion 154. In addition, the central portion 122 includes a fifth perforated trim 178 adjacent to the third acoustically transparent material 174 along the third occupant support portion 154, a sixth perforated trim 180 adjacent to the fourth acoustically transparent material 176 along the third occupant support portion 154, a seventh perforated trim 182 along the third side 158 and between the first backrest 114 and the third channel 162, and an eighth perforated trim 184 along the fourth side 160 and between the second backrest 118 and the fourth channel 164.

As shown in FIG. 7, each of the first speaker 116 and the second speaker 120 emits primary sound waves 186 and secondary sound waves 188 during use. The primary sound waves 186 of the first speaker 116 can be the same as, or different than, the primary sound waves 186 of the second speaker 120 depending on the audio sources being used by the occupants of the vehicle bench seat 100. The first speaker 116 is disposed within the first channel 130 defined by the first backrest 114 such that the primary sound waves 186 of the first speaker 116 travel through the first occupant support portion 124 of the first backrest 114 and a portion of the secondary sound waves 188 of the first speaker 116 travel through the first channel 130 defined by the first backrest 114, the first side 128 of the first backrest 114, the third side 158 of the central portion 122, and the third channel 162 defined by the central portion 122. The secondary sound waves 188 of the first speaker 116 are zeroing waves that are 180 degrees out of phase relative to the primary sound waves 186 of the first speaker 116 and are used to cancel the primary sounds waves 186 of the first speaker 116 in various portions of a vehicle cabin. The second speaker 120 is disposed within the second channel 144 defined by the second backrest 118 such that the primary sound waves 186 of the second speaker 120 travel through the second occupant support portion 138 of the second backrest 118 and a portion of the secondary sound waves 188 of the second speaker 120 travel through the second channel 144 defined by the second backrest 118, the second side 142 of the second backrest 118, the fourth side 160 of the central portion 122, and the fourth channel 164 defined by the central portion 122. The secondary sound waves 188 of the second speaker 120 are zeroing waves that are 180 degrees out of phase relative to the primary sound waves 186 of the second speaker 120 and are used to cancel the primary sound waves 186 of the second speaker 120 in various portion of the vehicle cabin.

As shown in FIG. 7, a portion 125 of the first channel 130 defined by the first backrest 114 that extends from the first side 128 toward the first speaker 116 directs the secondary sound waves 188 of the first speaker 116 away from the first backrest 114 and away from the first speaker 116 along an axis 127. The axis 127 is disposed at an angle 129 relative to the lengthwise axis 101 that is less than 90 degrees. A portion 139 of the second channel 144 defined by the second backrest 118 that extends from the second side 142 toward the second speaker 120 directs the secondary sound waves 188 of the second speaker 120 away from the second backrest 118 and away from the second speaker 120 along an axis 141. The axis 141 is disposed at an angle 143 relative to the lengthwise axis 101 that is less than 90 degrees. A portion 190 of the third channel 162 of the pivotable armrest 152 that extends from the second end 168 of the third channel 162 toward the first end 166 of the third channel 162 directs the secondary sound waves 188 of the first speaker 116 away from the central portion 122 and away from the first speaker 116 along a first axis 191. The first axis 191 is disposed at a first angle 193 relative to the lengthwise axis 101 that is less than 90 degrees. A portion 192 of the fourth channel 164 of the pivotable armrest 152 that extends from the second end 172 of the fourth channel 164 toward the first end 170 of the fourth channel 164 directs the secondary sound waves 188 of the second speaker 120 away from the central portion 122 and away from the second speaker 120 along a second axis 195. The second axis 195 is disposed at an angle 197 relative to the lengthwise axis 101 that is less than 90 degrees.

In the illustrated embodiment, the first channel 130 defined by the first backrest 114 is defined by a first foam layer 194 disposed within the first backrest 114, the second channel 144 defined by the second backrest 118 is defined by a second foam layer 196 disposed within the second backrest 118, and each of the third channel 162 and fourth channel 164 defined by the central portion 122 is defined by a third foam layer 198 disposed within the central portion 122. While foam layers 194, 196, 198 have been illustrated as defining the channels 130, 144, 162, 164, a channel included in a seat can be entirely, or partially, defined by any suitable structure capable of transmitting sound waves. Selection of a suitable structure to define a channel can be based on various considerations, such as the structural arrangement of a seat. Examples of suitable structures considered suitable to form a portion, or the entirety, of a channel include a foam layer(s), tubular member(s), and any other structure considered suitable for a particular embodiment. For example, FIGS. 11 and 12, as described in more detail herein, illustrate channels 430, 444, 462, and 464 that are defined by separate tubular members 502, 504, 506, and 508.

In use, when the pivotable armrest 152 is in the upright position, the sound cancelation system 110 provides a mechanism to direct zeroing sound waves (e.g., secondary sound waves 188) through the armrest 152 and toward an occupant that desires to cancel sound waves from a speaker not being used by the occupant. For example, when the first speaker 116 is actively emitting primary sound waves 186 from a first audio source that is different than a second audio source from which the second speaker 120 is actively emitting primary sound waves 186, the sound cancelation system 110 provides a mechanism to direct the secondary sound waves 188 of the first speaker 116 and the secondary sound waves 188 of the second speaker 120 through the armrest 152 using the third channel 162 and fourth channel 164 defined by the armrest 152. Furthermore, when the pivotable armrest 152 is in the lowered position, the structural arrangement of the first channel 130 defined by the first backrest 114 and the second channel 144 defined b the second backrest 118 provide a mechanism to direct zeroing sound waves (e.g., secondary sound waves 188) toward an occupant that desires to cancel sound waves from a speaker not being used by the occupant.

While the first backrest 114, the second backrest 118, and the central portion 122 have been illustrated as including acoustically transparent material and perforated trim, a first backrest, a second backrest, and a central portion of a vehicle bench seat can include any suitable material having any suitable structural arrangement. Selection of a suitable material and of a suitable structural arrangement for a material can be based on various considerations, including the type of speakers included in a seat. Examples of materials and of structural arrangements for a material considered suitable to use as an acoustically transparent material and/or a perforated trim include knitted layers of material, layer(s) of material having high air permeability, reticulated foam, acoustically transparent fabrics, acoustically transparent screens, and any other material or structural arrangement for a material considered suitable for a particular embodiment.

While the first speaker 116 has been illustrated as emitting primary sound waves 186 and secondary sound waves 188 that are 180 degrees out of phase relative to the primary sound waves 186 of the first speaker 116 and the second speaker 120 has been illustrated as emitting primary sound waves 186 and secondary sound waves 188 that are 180 degrees out of phase relative to the primary sound waves 186 of the second speaker 120, any suitable speaker that can produce primary sound waves and/or secondary sound waves can be included in a seat. Selection of suitable speakers can be based on various considerations, including the desired sound cancelation intended to be accomplished. Examples of speakers considered suitable to include in a seat include monopole speakers, dipole speakers, and any other speaker considered suitable for a particular embodiment. In the illustrated embodiment, the first and second speakers 116, 120 are dipole speakers.

While the channels 112 have been illustrated as directing sound waves at particular angles (e.g., angle 129, angle 143, angle 193, angle 197) relative to the lengthwise axis 101 of the vehicle bench seat 100, a portion of a channel can direct sound waves along any suitable axis disposed at any suitable angle relative to a lengthwise axis of a seat. Examples of angles considered suitable to position an axis along which sound waves are directed relative to a lengthwise axis of a seat include angles equal to, less than, greater than, or about 90 degrees, 45 degrees, and any other angle considered suitable for a particular embodiment.

While the first channel 130 has been illustrated as being incorporated into a first backrest 114 of a vehicle bench seat 100, the second channel 144 has been illustrated as being incorporated into a second backrest 118 of a vehicle bench seat 100, and the third channel 162 and fourth channel 164 have been illustrated as being incorporated into a central portion 122 of a vehicle bench seat, the channels described herein can be incorporated into any suitable seat and/or any suitable portion of a seat. Selection of a suitable seat and portion of a seat to incorporate a channel, such as those described herein, can be based on various considerations, including the location of sound waves intended to be canceled. Examples of seats considered suitable to incorporate a channel, such as those described herein, include bucket seats, bench seats, vehicle bucket seats, vehicle bench seats, and any other seat considered suitable for a particular embodiment. Examples of portions of seats considered suitable to incorporate a channel include within a backrest, within a headrest, within an armrest, and any other portion of a seat considered suitable for a particular embodiment. Furthermore, alternative embodiments can include a central portion that omits a pivotable armrest and includes first and second channels, as described herein, within the structure defining the central portion (e.g., backrest).

While the first backrest 114, the second backrest 118, and the central portion 122 have been illustrated as having particular structural arrangements, a backrest and a central portion can have any suitable structural arrangement and selection of a suitable structural arrangement can be based on various considerations, including the material(s) forming a backrest and/or a central portion. For example, the occupant support portions (e.g., occupant support portion 124, occupant support portion 138, occupant support portion 154) provide support for the back of an occupant when seated in a seat and can have any suitable contoured shape for comfort of the occupant.

Figure 8:
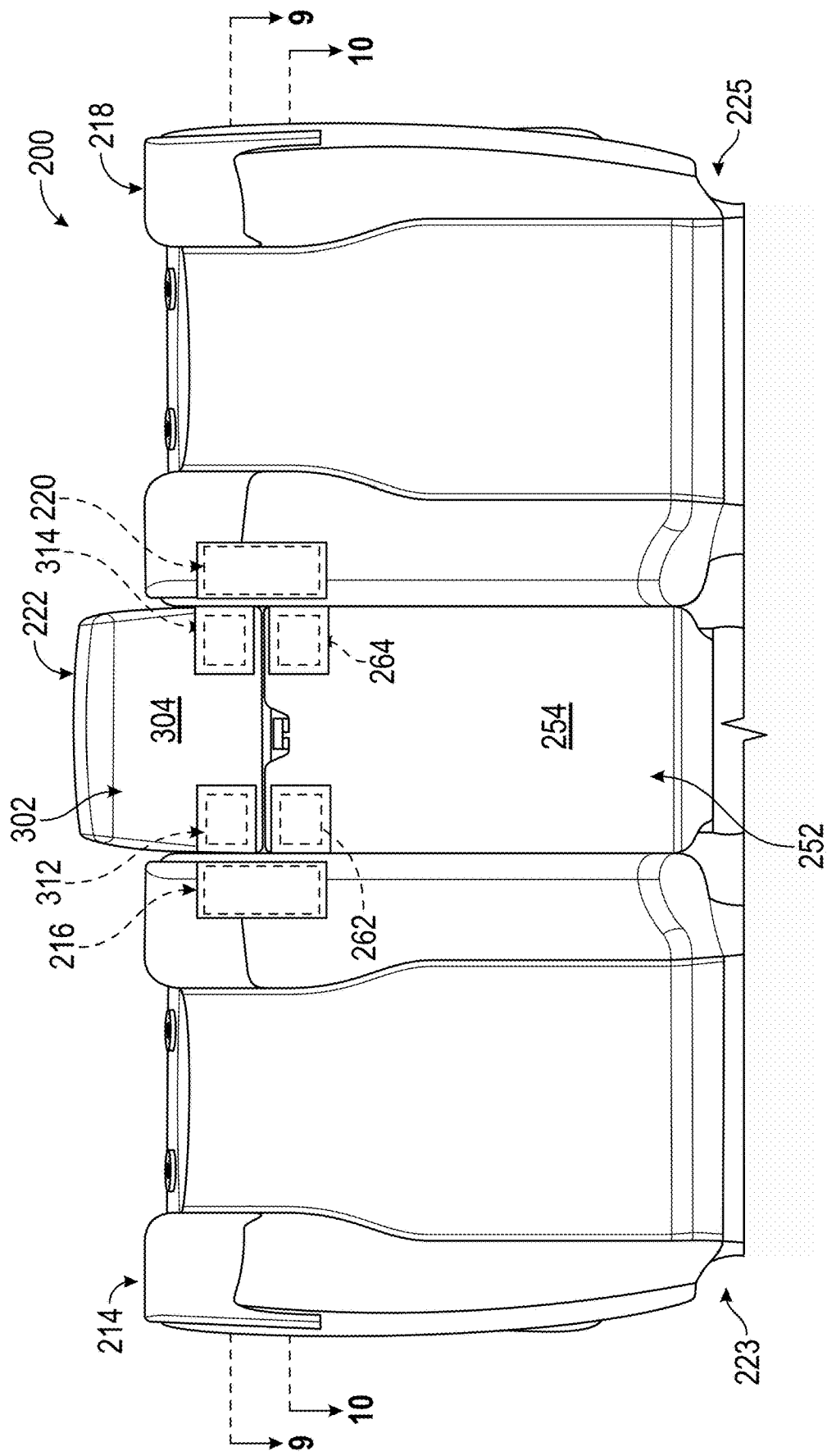
FIG. 8 is a partial elevation view of second embodiment of a vehicle bench seat that includes a sound cancelation system. The armrest is illustrated in an upright, or stored, position.

FIGS. 8, 9, and 10 illustrate a second embodiment of a vehicle bench seat 200 that includes a sound cancelation system 210. The sound cancelation system 210 includes channels 212 disposed within the vehicle bench seat 200 that are similar to the channels 112 illustrated in FIGS. 5, 6, and 7 and described above, except as detailed below. In the illustrated embodiment, the vehicle bench seat 200 has a first lengthwise axis 201, a second lengthwise axis 203, a first backrest 214, a first speaker 216, a second backrest 218, a second speaker 220, a central portion 222, a first seat base 223 disposed adjacent to the first backrest 214, and a second seat base 225 disposed adjacent to the second backrest 218.

In the illustrated embodiment, the central portion 222 includes a pivotable armrest 252 and a headrest 302, the first channel 230 of the first backrest 214 is disposed adjacent to the armrest 252 and the headrest 302, and the second channel 244 of the second backrest 218 is disposed adjacent to the armrest 252 and the headrest 302.

When the pivotable armrest 252 is in the upright position, the armrest 252 has a third occupant support portion 254, a third rear portion 256, a third side 258, a fourth side 260, and defines a third channel 262 and a fourth channel 264. The third side 258 is directed toward, and disposed adjacent to, the first backrest 214 and the fourth side 260 is directed toward, and disposed adjacent to, the second backrest 218. Each of the third side 258 and the fourth side 260 extends from the third occupant support portion 254 to the third rear portion 256 of the armrest 252. The third channel 262 extends from the third side 258 to the third occupant support portion 254. The fourth channel 264 extends from the fourth side 260 to the third occupant support portion 254.

The headrest 302 has a fourth occupant support portion 304, a fourth rear portion 306, a fifth side 308, a sixth side 310, and defines a fifth channel 312 and a sixth channel 314. The fifth side 308 is directed toward, and disposed adjacent to, the first backrest 214 and the sixth side 310 is directed toward, and disposed adjacent to, the second backrest 218. Each of the fifth side 308 and the sixth side 310 extends from the fourth occupant support portion 304 to the fourth rear portion 306 of the headrest 302, The fifth channel 312 extends from the fifth side 308 to the fourth occupant support portion 304. The sixth channel 314 extends from the sixth side 310 to the fourth occupant support portion 304.

The fifth channel 312 defined by the headrest 302 extends from a first end 316 disposed at the fifth side 308 to a second end 318 disposed at the fourth occupant support portion 304. The first end 316 of the fifth channel 312 is disposed adjacent to the first channel 230 defined by the first backrest 214. The sixth channel 314 defined by the headrest 302 extends from a first end 320 disposed at the sixth side 310 to a second end 322 disposed at the fourth occupant support portion 304, The first end 320 of the sixth channel 314 is disposed adjacent to the second channel 244 defined by the second backrest 218. In the illustrated embodiment, the headrest 302 includes a fifth acoustically transparent material 324 at the second end 318 of the fifth channel 312 adjacent to the fourth occupant support portion 304 and a sixth acoustically transparent material 326 at the second end 322 of the sixth channel. 314 adjacent to the fourth occupant support portion 304. In addition, the headrest 302 includes a ninth perforated trim 328 adjacent to the fifth acoustically transparent material 324 along the fourth occupant support portion 304, a tenth perforated trim 330 adjacent to the sixth acoustically transparent material 326 along the fourth occupant support portion 304, an eleventh perforated trim 332 between the first backrest 214 and the fifth acoustically transparent material 324 along the fifth side 308, and a twelfth perforated trim 334 between the second backrest 218 and the sixth acoustically transparent material 326 along the sixth side 310.

As shown in FIGS. 9 and 10, the first speaker 216 is disposed within the first channel 230 defined by the first backrest 214 such that a portion of the secondary sound waves 288 of the first speaker 216 travel through the first channel 230 defined by the first backrest 214, the first side 228 of the first backrest 214, the third channel 262 defined by the armrest 252, and the fifth channel 312 defined by the headrest 302. The second speaker 220 is disposed within the second channel 244 defined by the second backrest 218 such that a portion of the secondary sound waves 288 of the second speaker 220 travel through the second channel 244 defined by the second backrest 218, the second side 242 of the second backrest 218, the fourth channel 264 defined by the armrest 252, and the sixth channel 314 defined by the headrest 302.

As shown in FIG. 9, a portion 336 of the fifth channel 312 defined by the headrest 302 that extends from the second end 318 toward the first end 316 directs the secondary sound waves 288 of the first speaker 216 away from the central portion 222 and away from the first speaker 216 along a first axis 337. The first axis 337 is disposed at a first angle 339 relative to the first lengthwise axis 201 that is between about 45 degrees and about 90 degrees. Also shown in FIG. 9, a portion 338 of the sixth channel 314 defined by the headrest 302 that extends from the second end 322 toward the first end 320 directs the secondary sound waves 288 of the second speaker 220 away from the central portion 222 and away from the second speaker 220 along a second axis 341. The second axis 341 is disposed at an angle 343 relative to the lengthwise axis 201 that is between about 45 degrees and about 90 degrees.

In the illustrated embodiment, the first channel 230 defined by the first backrest 214 is defined by a first foam layer 294 disposed within the first backrest 214, the second channel 244 defined by the second backrest 218 is defined by a second foam layer 296 disposed within the second backrest 218, each of the third and fourth channels 262, 264 defined by the armrest 252 is defined by a third foam layer 298 disposed within the armrest 252, and each of the fifth and sixth channels 312, 314 defined by the headrest 302 is defined by a fourth foam layer 340 disposed within the headrest 302.

In use, when the pivotable armrest 252 is in the upright position, the sound cancelation system 210 provides a mechanism to direct zeroing sound waves (e.g., secondary sound waves 288) through both of the armrest 252 and the headrest 302 and toward an occupant that desires to cancel sound waves from a speaker not being used by the occupant. Furthermore, when the pivotable armrest 252 is in the lowered position, the structural arrangement of the first channel 230 defined by the first backrest 214 and the second channel 244 defined by the second backrest 218 provide a mechanism to direct zeroing sound waves (e.g., secondary sound waves 288) toward an occupant that desires to cancel sound waves from a speaker not being used by the occupant.

Figure 11:
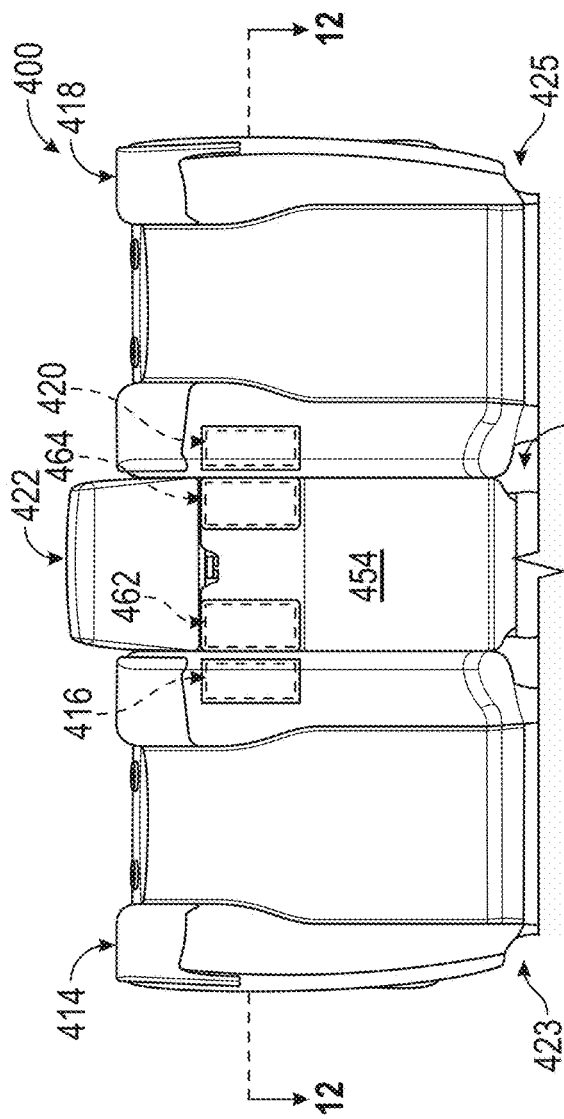
FIG. 11 is a partial elevation view of a third embodiment of a vehicle bench seat that includes a sound cancelation system. The armrest is illustrated in an upright, or stored, position.
Figure 12:
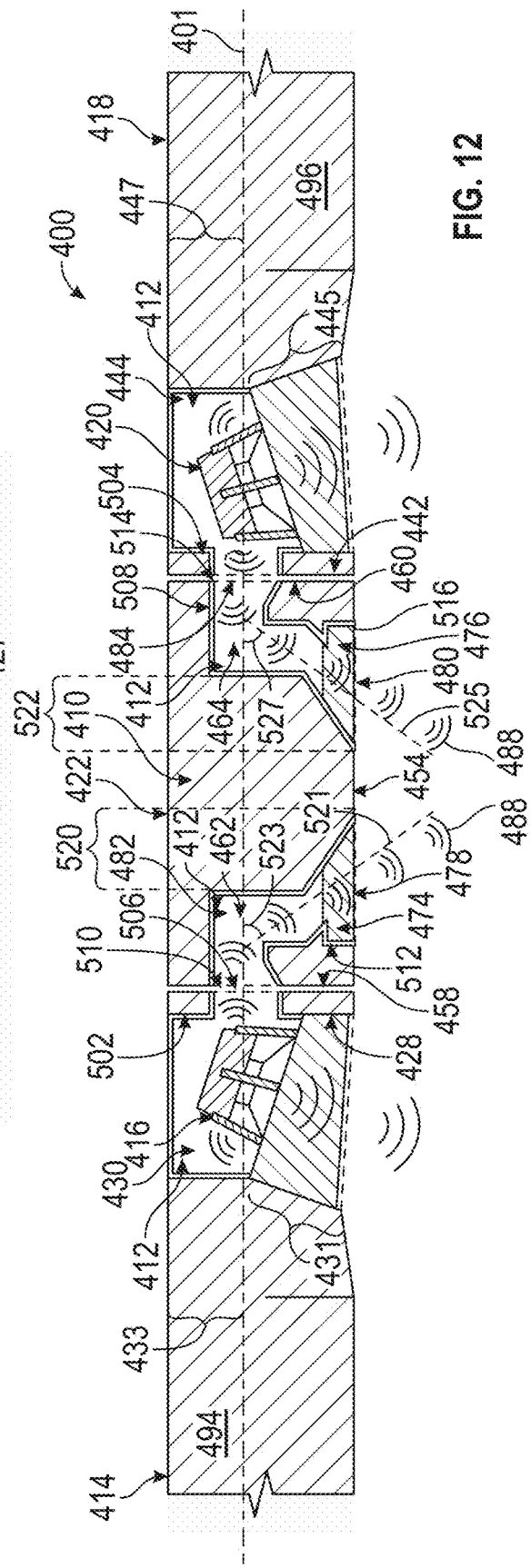
FIG. 12 is a partial cross-sectional view of the vehicle bench seat illustrated in FIG. 11 taken along line 12-12.

FIGS. 11 and 12 illustrate a third embodiment of a vehicle bench seat 400 that includes a sound cancelation system 410. The sound cancelation system 410 includes channels 412 disposed within the vehicle bench seat 400 that are similar to the channels 112 illustrated in FIGS. 5, 6, and 7 and described above, except as detailed below. In the illustrated embodiment, the vehicle bench seat 400 has a lengthwise axis 401, a first backrest 414, a first speaker 416, a second backrest 418, a second speaker 420, a central portion 422, a first seat base 423 disposed adjacent to the first backrest 414, a second seat base 425 disposed adjacent to the second backrest 418, and a third seat base 427 disposed adjacent to the central portion 422.

In the illustrated embodiment, the first channel 430 within the first backrest 414 has a first portion 431 defined by a first foam layer 494 and a second portion 433 formed of a first tubular member 502. The second channel 444 within the second backrest 418 has a first portion 445 defined by a second foam layer 496 and a second portion 447 formed of a second tubular member 504. The third channel 462 within the central portion 422 is formed of a third tubular member 506 and the fourth channel 464 within the central portion 422 is formed of a fourth tubular member 508.

The first tubular member 502 extends from the first speaker 416 to the first side 428 of the first backrest 414. The second tubular member 504 extends from the second speaker 420 to the second side 442 of the second backrest 418. The third tubular member 506 extends from a first end 510 disposed at the third side 458 to a second end 512 disposed at the third occupant support portion 454. When the pivotable armrest 452 is in the upright position, the first end 510 of the third tubular member 506 is disposed adjacent to the first channel 430 defined by the first backrest 414. The fourth tubular member 508 extends from a first end 514 disposed at the fourth side 460 to a second end 516 disposed at the third occupant support portion 454. When the pivotable armrest 452 is in the upright position, the first end 514 of the fourth tubular member 508 is disposed adjacent to the second channel 444 defined by the second backrest 418. Optionally, a tubular member can include a grid on an end of the tubular member to enhance the structural integrity of the end of the tubular member.

In the illustrated embodiment, the central portion 422 includes a third acoustically transparent material 474 within the third tubular member 506 at the second end 512 adjacent to the third occupant support portion 454 and a fourth acoustically transparent material 476 within the fourth tubular member 508 at the second end 516 adjacent to the third occupant support portion 454. In addition, the central portion 422 includes a fifth perforated trim 478 adjacent to the third acoustically transparent material 474 along the third occupant support portion 454, a sixth perforated trim 480 adjacent to the fourth acoustically transparent material 476 along the third occupant support portion 454, a seventh perforated trim 482 between the first backrest 414 and the third acoustically transparent material 474 along the third side 458, and an eighth perforated trim 484 between the second backrest 418 and the fourth acoustically transparent material 476 along the fourth side 460.

As shown in FIG. 12, the first speaker 416 is disposed within the first channel 430 defined b the first backrest 414 such that a portion of the secondary sound waves 488 of the first speaker 416 travel through the first tubular member 502 disposed within the first backrest 414 and the third tubular member 506 disposed within the central portion 422. The second speaker 420 is disposed within the second channel 444 defined by the second backrest 418 such that a portion of the secondary sound waves 488 of the second speaker 420 travel through the second tubular member 504 disposed within the second backrest 418 and the fourth tubular member 508 disposed within the central portion 422.

A portion 520 of the third tubular member 506 that extends from the second end 512 toward the first end 514 directs the secondary sound waves 488 of the first speaker 416 away from the central portion 422 and away from the first speaker 416 along a first axis 521. The first axis 521 is disposed at a first angle 523 relative to the lengthwise axis 401 that is less than 90 degrees. A portion 522 of the fourth tubular member 508 that extends from the second end 516 toward the first end 514 directs the secondary sound waves 488 of the second speaker 420 away from the central portion 422 and away from the second speaker 420 along a second axis 525. The second axis 525 is disposed at an angle 527 relative to the lengthwise axis 401 that is less than 90 degrees.

A first tubular member, a second tubular member, a third tubular member, and a fourth tubular member included in a vehicle bench seat can be formed of any suitable material and have any suitable structural arrangement capable of transmitting sound waves, as described herein. Examples of materials considered suitable to form a tubular member included in a vehicle bench seat include plastics, and any other material considered suitable for a particular embodiment.

FIGS. 13, 14, 15, 16, and 17 illustrate a fourth embodiment of a vehicle bench seat 600 that includes a sound cancelation system 610, In the illustrated embodiment, the sound cancelation system 610 includes a plurality of speakers 616 disposed within the vehicle bench seat 600 that produce zeroing waves during use, as described in more detail herein. The vehicle bench seat 600 is similar to the vehicle bench seat 100 illustrated in FIGS. 5, 6, and 7 and described above, except as detailed below. The vehicle bench seat 600 has a lengthwise axis 601, a first backrest 614, a first plurality of speakers 616, a second backrest 618, a second plurality of speakers 620, a central portion 622, a first seat base 623 disposed adjacent to the first backrest 614, and a second seat base 625 disposed adjacent to the second backrest 618.

As shown in FIG. 14, the first backrest 614 has a first occupant support portion 624, a first rear portion 626, a first side 628, and defines a first chamber 630 within which a speaker 617 of the first plurality of speakers 616 is disposed. The first chamber 630 extends from the first occupant support portion 624 toward the first rear portion 626. The first backrest 614 includes a first acoustically transparent material 632 between the speaker 617 and the first occupant support portion 624 and a first perforated trim 634 adjacent to the first acoustically transparent material 632 along the first occupant support portion 624.

The second backrest 618 has a second occupant support portion 638, a second rear portion 640, a second side 642, and defines a second chamber 644 within which a speaker 621 of the second plurality of speakers 620 is disposed. The second chamber 644 extends from the second occupant support portion 638 toward the second rear portion 640. The second backrest 618 includes a second acoustically transparent material 646 between the speaker 621 and the second occupant support portion 638 and a second perforated trim 648 adjacent to the second acoustically transparent material 646 along the second occupant support portion 638.

The central portion 622 is disposed between the first backrest 614 and the second backrest 618. In the illustrated embodiment, the central portion 622 includes a pivotable armrest 652, a pivotable headrest 702, a first speaker 704, and a second speaker 706. Each of the first speaker 704 and the second speaker 706 is disposed within the pivotable headrest 702.

Figure 15:
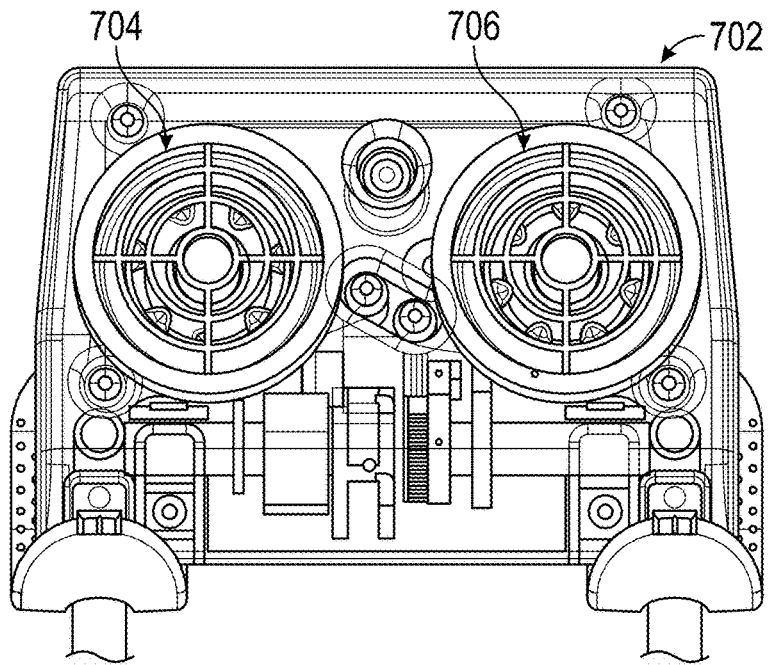
FIG. 15 is a partial elevation view of the headrest of the vehicle bench seat illustrated in FIG. 13. The headrest is in the upright position.
Figure 16:
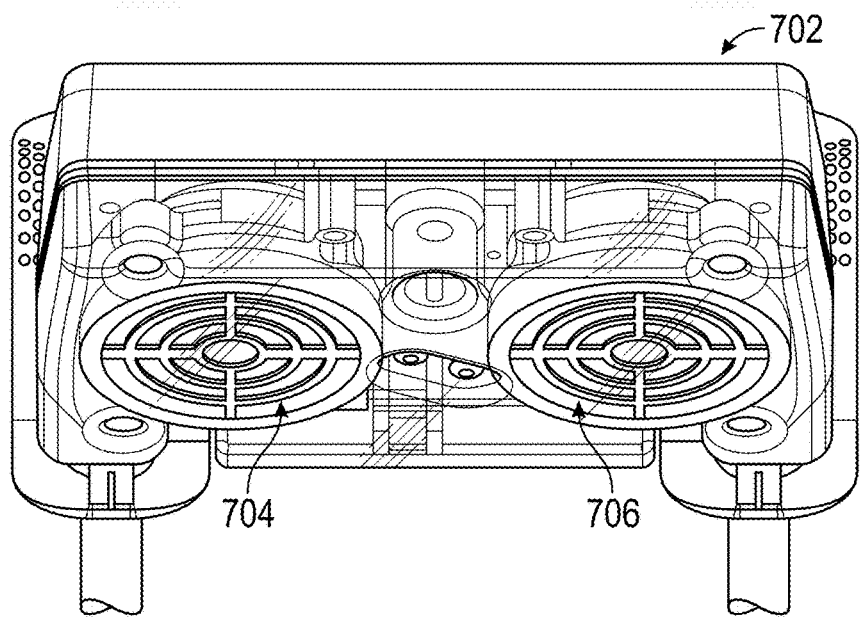
FIG. 16 is a partial elevation view of the headrest illustrated in FIG. 15. The headrest is illustrated in the tilted position.
Figure 17:
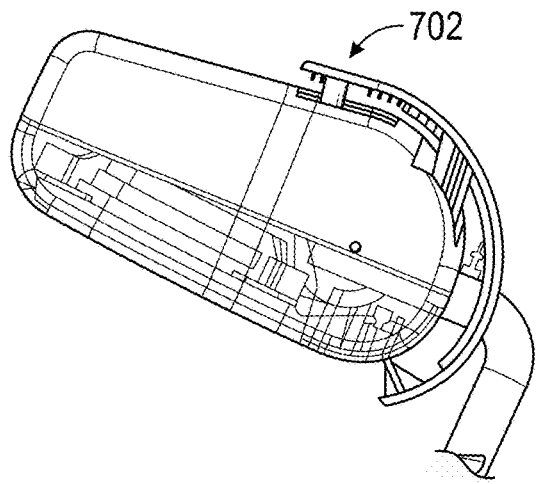
FIG. 17 is a partial side view of the headrest illustrated in FIG. 15. The headrest is illustrated in the titled position.

The pivotable headrest 702 is moveable between an upright position, as shown in FIGS. 13 and 15, and a tilted position, as shown in FIGS. 16 and 17. The pivotable headrest 702 has a third occupant support portion 708, a third rear portion 710, a third side 712, a fourth side 714, and defines a third chamber 716 and a fourth chamber 718. The third side 712 is disposed adjacent to the first backrest 614 and the fourth side 714 is disposed adjacent to the second backrest 618. Each of the third side 712 and the fourth side 714 extends from the third occupant support portion 708 to the third rear portion 710. The third chamber 716 defined by the headrest 702 extends from the third occupant support portion 708 toward the third rear portion 710. The fourth chamber 718 defined by the headrest 702 extends from the third occupant support portion 708 toward the third rear portion 710. The first speaker 704 is disposed within the third chamber 716 defined by the headrest 702 and the second speaker 706 is disposed within the fourth chamber 718 defined by the headrest 702.

The headrest 702 includes a third acoustically transparent material 720 between the first speaker 704 and the third occupant support portion 708 and a fourth acoustically transparent material 722 between the second speaker 706 and the third occupant support portion 708. In addition, the headrest 702 includes a third perforated trim 724 adjacent to the third acoustically transparent material 720 along the third occupant support portion 708 and a fourth perforated trim 726 adjacent to the fourth acoustically transparent material 722 along the third occupant support portion 708.

Each of the first plurality of speakers 616 disposed within the first backrest 614, the second plurality of speakers 620 disposed within the second backrest 618, the first speaker 704 disposed within the headrest 702, and the second speaker 706 disposed within the headrest 702 emits primary sound waves 686 during use. The speaker 617 of the first plurality of speakers 616 is disposed within the first chamber 630 defined by the first backrest 614 such that the primary sound waves 686 travel through the first occupant support portion 624 of the first backrest 614. The speaker 621 of the second plurality of speakers 620 is disposed within the second chamber 644 defined by the second backrest 618 such that the primary sound waves 686 travel through the second occupant support portion 638 of the second backrest 618. The first speaker 704 is disposed within the third chamber 716 defined by the headrest 702 such that the primary sound waves 686 travel through the third occupant support portion 708 of the headrest 702. The second speaker 706 is disposed within the fourth chamber 718 defined by the headrest 702 such that the primary sound waves 686 travel through the third occupant support portion 708 of the headrest 702. In the illustrated embodiment, the first and second speakers 704, 706 are monopole speakers.

The primary sound waves 686 of the first speaker 704 disposed within the headrest 702 are zeroing waves that are 180 degrees out of phase relative to the primary sound waves 686 of one or more speakers of the second plurality of speakers 620 (e.g., speaker 621) and are used to cancel the primary sounds waves 686 of one or more speakers of the second plurality of speakers 620 (e.g., speaker 621). The primary sound waves 686 of the second speaker 706 disposed within the headrest 702 are zeroing waves that are 180 degrees out of phase relative to the primary sound waves 686 of one or more speakers of the first plurality of speakers 616 (e.g., speaker 617) and are used to cancel the primary sounds waves 686 of one or more speakers of the first plurality of speakers 616 (e.g., speaker 617).

The first and second speakers 704, 706 disposed within the headrest 702 can be activated using any suitable method or technique and selection of a suitable method or technique to activate speakers that are used to cancel sound waves within a vehicle cabin can be based on various considerations, including the arrangement of the various speakers within a vehicle cabin. For example, a first speaker included in a headrest (e.g., first speaker 704) can be activated by an occupant of a vehicle cabin using a switch, activated using one or more sensors disposed within a seat within which the occupant is positioned that sense the occupant's weight (e.g., a seat that includes the second backrest 618), and/or activated upon an occupant activating an audio system (e.g., second plurality of speakers 620). Similarly, a second speaker included in a headrest (e.g., second speaker 706) can be activated by an occupant of a vehicle cabin using a switch, activated using one or more sensors disposed within a seat within which the occupant is positioned that sense the occupant's weight (e.g., a seat that includes the first backrest 614), and/or activated upon an occupant activating an audio system (e.g., first plurality of speakers 616).

In the illustrated embodiment, the first chamber 630 defined by the first backrest 614 is defined by a first foam layer 694 disposed within the first backrest 614, the second chamber 644 defined by the second backrest 618 is defined by a second foam layer 696 disposed within the second backrest 618, and each of the third and fourth chambers 716, 718 defined by the headrest 702 is defined by a third foam layer 728 disposed within the headrest 702, While foam layers 694, 696, 728 have been illustrated as defining the chambers 630, 644, 716, 718, a chamber included in a seat can be entirely, or partially, defined by any suitable structure capable of transmitting sound waves and selection of a suitable structure to define a chamber can be based on various considerations, such as the structural arrangement of a seat. For example, a chamber can be partially, or entirely, defined by a partially enclosed structure formed of any suitable material (e.g., polymer, plastic).

In use, the sound cancelation system 610 provides a mechanism to direct zeroing sound waves (e.g., primary sound waves 686 of first speaker 704, primary sound waves 686 of second speaker 706) toward an occupant that desires to cancel sound waves from a speaker not being used by the occupant.

Movement of the headrest 702 between its upright and tilted positions can be accomplished using any suitable system and selection of a suitable system to accomplish movement of a headrest can be based on various considerations, including the structural arrangement of a headrest relative to a remaining portion of a vehicle seat. Examples of suitable systems considered suitable to accomplish movement of a headrest between an upright position and a tilted position include conventional systems, using a motor and sleeve system, and any other system considered suitable for a particular embodiment. For example, in a motor and sleeve system, the motor, which can be activated by an occupant of a vehicle cabin using a switch, drives a sleeve along a shaft to accomplish movement of a headrest between upright and tilted positions about the shaft. For example, a sleeve and a shaft can be connected via a pin that is fixed to the sleeve and extends through a helical slot in the shaft to accomplish about 40 degrees of forward tilt. Alternatively, the sleeve and shaft can be connected via a pin that is fixed to the shaft and extends through a helical slot in the sleeve to accomplish about 40 degrees of forward tilt. A motor can be attached to a sleeve using any suitable structure capable of accomplishing movement of the sleeve. For example, a motor can be attached to a sleeve using a toothed belt and gears, or a circulating rope attached to the sleeve and the motor. Alternatively, a solenoid can be used to accomplish movement of a sleeve. Once rotation of the sleeve has begun, the sleeve will move axially along the length of the shaft until it reaches an end of the slot moving a mechanical lock from a locked position to an unlocked position such that movement of the headrest can be initiated. A mechanical lock can include any suitable device and/or system capable of maintaining the position of a headrest until it is moved to an unlocked position. For example, a mechanical lock can include mating notches, a sideward gear tooth system, a locking block and spring system, and/or a locking pin system.

In a locking block and spring system, axial movement of the sleeve along the length of the shaft moves a locking block and a spring axially along the shaft in the same direction as the sleeve until a cam is moved in first direction and the headrest begins to move from the upright position to the tilted position. When movement of the headrest from the titled position toward the upright position is initiated, the spring pushes the locking block such that the cam is moved in a second direction, opposite the first direction, and locks the headrest in position. In a locking pin system, as the sleeve moves axially along the length of the shaft in a first direction, a locking pin is removed from within a hole defined in a support bracket attached to the headrest such that movement of the headrest from the upright position toward the tilted position can be accomplished. To lock the headrest in a particular position, the sleeve is moved in a second, opposite direction such that the pin is positioned within a hole (e.g., using a spring) defined by the support bracket to lock the headrest in place.

While the various embodiments have been illustrated as vehicle bench seats, the features of the sound cancelations systems described herein can be incorporated into any suitable structure and/or seat assembly and selection of a suitable structure and/or seat assembly to incorporate a sound cancelation system, such as those described herein, can be based on various considerations, including the desired sound cancelation intended to be accomplished. Furthermore, the various embodiments described herein can be used in combination with the electronic sound absorbers described in U.S. Pat. No. 2,983,790 to Olson, which is hereby incorporated by reference in its entirety.

Those with ordinary skill in the art will appreciate that various modifications and alternatives for the described and illustrated embodiments can be developed in light of the overall teachings of the disclosure, and that the various elements and features of one example described and illustrated herein can be combined with various elements and features of another example without departing from the scope of the invention. Accordingly, the particular examples disclosed herein have been selected by the inventor(s) simply to describe and illustrate examples of the invention and are not intended to limit the scope of the invention or its protection, which is to be given the full breadth of the appended claims and any and all equivalents thereof.

What is claimed is:

1. A seat comprising:
    a first backrest having a first occupant support portion, a first side, and defining a first channel extending from the first occupant support portion to the first side;
    a first speaker disposed within the first channel;
    a second backrest having a second occupant support portion, a second side, and defining a second channel extending from the second occupant support portion to the second side;
    a second speaker disposed within the second channel;
    a central portion disposed between the first backrest and the second backrest, the central portion having a third occupant support portion, a third side directed toward the first backrest, a fourth side directed toward the second backrest, and defining a third channel extending from the third side to the third occupant support portion, and a fourth channel extending from the fourth side to the third occupant support portion; and
    a seat base disposed adjacent to the first backrest, the second backrest, and the central portion, wherein either:
    the central portion includes a pivotable armrest moveable between an upright position and a lowered position and each of the third channel and the fourth channel is defined on the pivotable armrest; or
    each of the first speaker and the second speaker emits primary sound waves and secondary sound waves during use, the first speaker is disposed within the first channel such that a portion of the secondary sound waves of the first speaker travel through the first channel and the third channel, the second speaker is disposed within the second channel such that a portion of the secondary sound waves of the second speaker travel through the second channel and the fourth channel, the third channel directs the secondary sound waves of the first speaker away from the central portion and the first speaker, and the fourth channel directs the secondary sound waves of the second speaker away from the central portion and the second speaker.

2. The seat of claim 1, wherein the central portion includes the pivotable armrest moveable between the upright position and the lowered position; and wherein each of the third channel and the fourth channel is defined on the pivotable armrest.

3. The seat of claim 2, wherein the third channel has a first end disposed adjacent to the first channel when the pivotable armrest is in the upright position; and
    wherein the fourth channel has a first end disposed adjacent to the second channel when the pivotable armrest is in the upright position.

4. The seat of claim 1, wherein each of the first speaker and the second speaker emits primary sound waves and secondary sound waves during use; wherein the first speaker is disposed within the first channel such that the portion of the secondary sound waves of the first speaker travel through the first channel and the third channel; and wherein the second speaker is disposed within the second channel such that the portion of the secondary sound waves of the second speaker travel through the second channel and the fourth channel.

5. The seat of claim 4, wherein the secondary sound waves of the first speaker are zeroing waves that are 180 degrees out of phase relative to the primary sound waves of the first speaker; and
    wherein the secondary sound waves of the second speaker are zeroing waves that are 180 degrees out of phase relative to the primary sound waves of the second speaker.

6. The seat of claim 4, wherein the third channel directs the secondary sound waves of the first speaker away from the central portion and the first speaker; and
    wherein the fourth channel directs the secondary sound waves of the second speaker away from the central portion and the second speaker.

7. The seat of claim 6, wherein said seat has a lengthwise axis; and
    wherein the secondary sound waves of the first speaker are directed away from the central portion and away from the first speaker along an axis disposed at an angle relative to said lengthwise axis that is less than 90 degrees.

8. The seat of claim 6, wherein said seat has a lengthwise axis; and
    wherein the secondary sound waves of the second speaker are directed away from the central portion and the away from the second speaker along an axis disposed at an angle relative to said lengthwise axis that is less than 90 degrees.

9. The seat of claim 4, wherein the first channel directs the secondary sound waves of the first speaker away from the first backrest and the first speaker; and
    wherein the second channel directs the secondary sound waves of the second speaker away from the second backrest and the second speaker.

10. The seat of claim 1, wherein a portion of the first channel is formed of a first tubular member extending from the first speaker to the first side; and
    wherein a portion of the second channel is formed of a second tubular member extending from the second speaker to the second side.

11. The seat of claim 10, wherein the third channel is formed of a third tubular member; and
    wherein the fourth channel is formed of a fourth tubular member.

12. The seat of claim 11, wherein each of the first tubular member, the second tubular member, the third tubular member, and the fourth tubular member is formed of plastic.

13. The seat of claim 1, wherein a portion of the first channel is defined by a first foam layer disposed within the first backrest;
    wherein a portion of the second channel is defined by a second foam layer disposed within the second backrest; and
    wherein a portion of each of the third channel and the fourth channel is defined by a third foam layer disposed within the central portion.

14. The seat of claim 1, wherein the first backrest includes a first perforated trim between the first speaker and the third side; and
   wherein the second backrest includes a second perforated trim between the second speaker and the fourth side.

15. The seat of claim 1, wherein the central portion includes a third acoustically transparent material and a fourth acoustically transparent material, the third acoustically transparent material disposed within the third channel and adjacent to the third occupant support portion, the fourth acoustically transparent material disposed within the fourth channel and adjacent to the third occupant support portion.

16. The seat of claim 1, wherein the central portion includes a headrest;
   wherein each of the third channel and the fourth channel is defined on the headrest;
   wherein the third channel has a first end disposed adjacent to the first channel; and
   wherein the fourth channel has a first end disposed adjacent to the second channel.

17. The seat of claim 1, wherein the central portion includes a pivotable headrest;
   further comprising a third speaker and a fourth speaker disposed within the pivotable headrest, each of the third speaker and the fourth speaker emitting primary sound waves during use;
   wherein the primary sound waves of the third speaker are zeroing waves that are 180 degrees out of phase relative to the primary sound waves of the second speaker; and
   wherein the primary sound waves of the fourth speaker are zeroing waves that are 180 degrees out of phase relative to the primary sound waves of the first speaker.

18. The seat of claim 1, wherein the seat base comprises a plurality of seat bases, a first seat base of the plurality of seat bases disposed adjacent to the first backrest, a second seat base of the plurality of seat bases disposed adjacent to the second backrest, and a third seat base of the plurality of seat bases disposed adjacent to the central portion.

19. A seat comprising:
   a first backrest having a first occupant support portion, a first side, and defining a first channel extending from the first occupant support portion to the first side;
   a first speaker disposed within the first channel, the first speaker emitting primary sound waves and secondary sound waves during use;
   a second backrest having a second occupant support portion, a second side, and defining a second channel extending from the second occupant support portion to the second side;
   a second speaker disposed within the second channel, the second speaker emitting primary sound waves and secondary sound waves during use;
   a central portion disposed between the first backrest and the second backrest, the central portion including a pivotable armrest moveable between an upright position and a lowered position, the pivotable armrest having a third occupant support portion, a third side directed toward the first backrest, a fourth side directed toward the second backrest, and defining a third channel extending from the third side to the third occupant support portion, and a fourth channel extending from the fourth side to the third occupant support portion, the third channel having a first end disposed adjacent to the first channel when the pivotable armrest is in the upright position, the fourth channel having a first end disposed adjacent to the second channel when the pivotable armrest is in the upright position;
   a seat base disposed adjacent to the first backrest, the second backrest, and the central portion;
   wherein the first speaker is disposed within the first channel such that a portion of the secondary sound waves of the first speaker travel through the first channel and the third channel; and
   wherein the second speaker is disposed within the second channel such that a portion of the secondary sound waves of the second speaker travel through the second channel and the fourth channel.

20. A seat comprising:
   a first backrest having a first occupant support portion, a first side, and defining a first channel extending from the first occupant support portion to the first side;
   a first speaker disposed within the first channel, the first speaker emitting primary sound waves and secondary sound waves during use, the secondary sound waves of the first speaker being zeroing waves that are 180 degrees out of phase relative to the primary sound waves of the first speaker;
   a second backrest having a second occupant support portion, a second side, and defining a second channel extending from the second occupant support portion to the second side;
   a second speaker disposed within the second channel, the second speaker emitting primary sound waves and secondary sound waves during use, the secondary sound waves of the second speaker being zeroing waves that are 180 degrees out of phase relative to the primary sound waves of the second speaker;
   a central portion disposed between the first backrest and the second backrest, the central portion including a pivotable armrest moveable between an upright position and a lowered position, the pivotable armrest having a third occupant support portion, a third side directed toward the first backrest, a fourth side directed toward the second backrest, and defining a third channel extending from the third side to the third occupant support portion, and a fourth channel extending from the fourth side to the third occupant support portion, the third channel having a first end disposed adjacent to the first channel when the pivotable armrest is in the upright position, the third channel directing the secondary sound waves of the first speaker away from the central portion and the first speaker, the fourth channel having a first end disposed adjacent to the second channel when the pivotable armrest is in the upright position, the fourth channel directing the secondary sound waves of the second speaker away from the central portion and the second speaker; and
   a seat base disposed adjacent to the first backrest, the second backrest, and the central portion;
   wherein the first speaker is disposed within the first channel such that a portion of the secondary sound waves of the first speaker travel through the first channel and the third channel; and
   wherein the second speaker is disposed within the second channel such that a portion of the secondary sound waves of the second speaker travel through the second channel and the fourth channel.

* * * * *